United States Patent
Mohon et al.

[11] 3,761,156
[45] Sept. 25, 1973

[54] HOLOGRAPHIC COLORED LIGHT PATTERN SIMULATION

[75] Inventors: Windell N. Mohon, Winter Park; Alfred H. Bodemann; Geroge Derderian, both of Maitland, all of Fla.

[73] Assignee: The United States of America as represented by the Secretary of the Navy, Washington, D.C.

[22] Filed: Apr. 11, 1972

[21] Appl. No.: 242,959

[52] U.S. Cl. .................................. 350/3.5, 35/12 N
[51] Int. Cl. .................... G02b 27/00, G09b 9/08
[58] Field of Search ............... 35/12 N, 12 S, 12 B; 350/3.5

[56] References Cited
UNITED STATES PATENTS

| | | | |
|---|---|---|---|
| 3,533,104 | 10/1970 | Habegger | 250/3.5 |
| 3,567,305 | 3/1971 | Collier et al. | 350/3.5 |
| 3,580,656 | 5/1971 | Carson | 350/3.5 |
| 3,600,055 | 8/1971 | Emerick | 35/12 N |

Primary Examiner—Herman Karl Saalbach
Attorney—Richard S. Sciascia et al.

[57] ABSTRACT

A method of generating a holographically reconstructed image of a model object so that the image will appear to have lamps of various predetermined colors at predetermined locations and having predetermined sectors of viewability in which color is generated from a laser light source having a coherent beam output comprising a plurality of wavelengths characteristic of different colors and wherein packs of fiber optics are utilized to carry selected color light for presentation at predetermined locations on the model object. The ends of the optic fibers of the model are received in the model at selected distances from a face thereof as desired to provide desired angles of view whereat the lights become apparent to the viewer of the multicolor holographic image dependent upon the use to which the resultant holographic image is directed. One such use is in the simulation of a Fresnel Lens Optical Landing System used aboard aircraft carriers.

5 Claims, 8 Drawing Figures

HOLOGRAPHIC COLORED LIGHT PATTERN SIMULATION

BACKGROUND OF THE INVENTION

The invention relates to the fields of holographically reconstructed images and to simulation by such means for training purposes.

In the past holograms have been used in simulation apparatus for various training applications. Patterns of lights have been used in such applications as the simulation of Fresnel Lens Optical Landing Systems. In such latter simulations, lights of different colors have been used to indicate a base line and various angles of glide toward a carrier deck. The operation of such lights in coordination with the relationship of the aircraft and carrier deck have been acomplished by computerized electrical or electromechanical means including complicated gating circuits. Problems in relation to the prior art approaches relate to undesirable size, cost, maintenance, and performance of required equipment.

SUMMARY OF THE INVENTION

The present invention is directed to the use of optic fibers as the object in a multicolor hologram and the use of a coherent laser light source having a plurality of wavelengths characteristic of different colors and positioning the object end of the optic fibers in recessed passageways of a holder mounted on the carrier deck such that a holographically reconstructed image of the carrier and the light pattern formed in the holder may be generated. Such image will then appear to have lamps of various predetermined colors and patterns at predetermined locations and will present predetermined sectors of viewability corresponding to a Fresnel Lens Optical Landing System but without the need for computer assist on complicated electronic circuitry. The holographically generated image itself simulates, via the viewability factor thereof, actual landing conditions. The same method of forming a holographically generated image may also be employed in other applications.

DESCRIPTION OF THE PREFERRED EMBODIMENT

The invention described herein is an improved method of generating a holographically reconstructed image of a model object so that the image will appear to have lamps of various predetermined colors at predetermined locations and having predetermined sectors of viewability. The invention is useful in any application in which the simulation of an object with light effect factors as described above is desired in a training aid. The invention will be described by way of example in relation to one specific application wherein the method is employed in the simulation of a Fresnel Lens Optical Landing System (FLOLS), used aboard aircraft carriers, in a holographic carrier landing trainer. The FLOLS is composed of a series of colored lights which produce a datum pattern including one series of green lights for a datum line of reference, a second series of yellow lights positioned perpendicular to the datum line to indicate various angles of glide relative to the datum line, and a red light below the series of yellow lights indicating a dangerously low approach angle.

Figure 1:
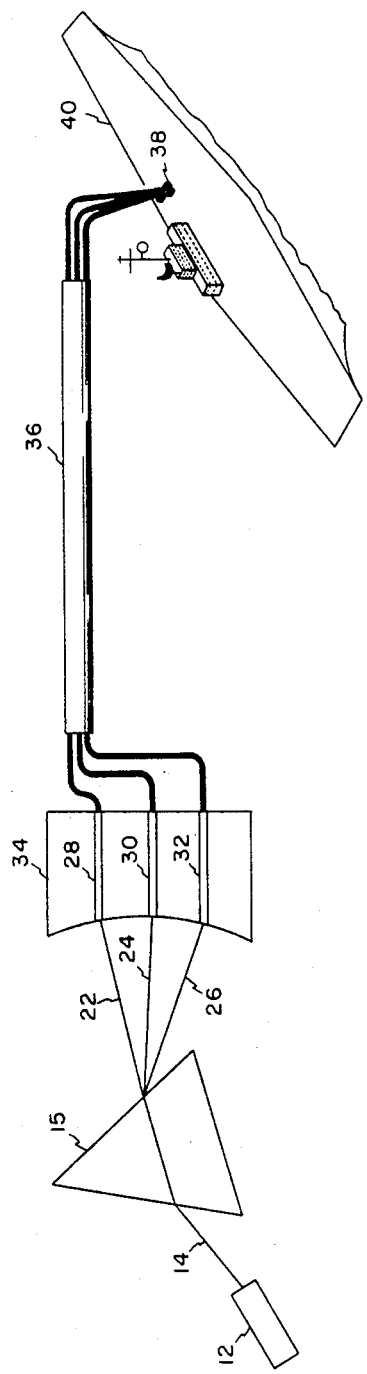
FIG. 1 is a diagrammatic view of apparatus employed in holographically generating an image in accordance with the invention.
Figure 2:
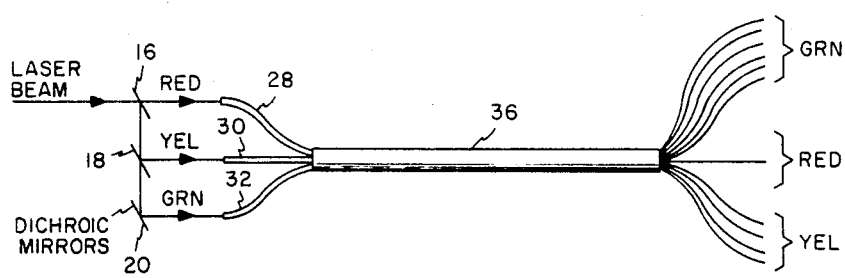
FIG. 2 illustrates a modification of a laser ray wavelength divider means portion of the apparatus shown in FIG. 1.

Referring to FIG. 2, there is shown diagrammatically the basic elements employed in the method of the invention. As shown in FIG. 1, a laser light source 12 is utilized to produce a beam 14 derived from the laser light source 12 as shown in detail in FIG. 7. The laser is selected of the type having a coherent laser beam output comprising a plurality of wavelengths characteristic of different colors. For example, the Krypton laser is well suited for the intended real time simulation because it produces wavelengths of several colors, including green, yellow, and red, and because the power available in the three colors mentioned is sufficient to produce the necessary exposure on the holographic plate 42 during the recording procedure (see FIG. 7), as well as the necessary lumens for visibility upon reconstruction of the multicolor hologram.

The laser beam is then passed through a wavelength divider means which is shown in FIG. 1 as the prism 15 and in FIG. 2 as the dichroic mirrors 16, 18 and 20. The preferred form is the prism 15, as in FIG. 1, which divides the beam into three wave forms 22, 24 and 26 representative of the colors red, yellow, and green. The split beams 22, 24 and 26 are directed respectively to packs of optic fibers 28, 30 and 32, the ends being held by a holder 34. The packs are held in an optic bundle 36 and the other ends of the fiber packs are connected in an object holder 38 in a manner to form a FLOLS pattern as will be described. The holder 38 is mounted on a model 40 of an aircraft carrier which will be part of the holographically generated image.

FIG. 2 is provided to show the alternate method of using mirrors 16, 18 and 20 and also to show how each fiber pack which contains one or several optic fibers, as required, is branched out at the object end in individual optic fibers, as shown, to provide in this particular application one red optic fiber, four yellow optic fibers and six green optic fibers. In FIG. 1, the fiber packs 28, 30 and 32 are branched out at the object end in the same manner and housed in associated passages of the object holder 38.

Figure 5:
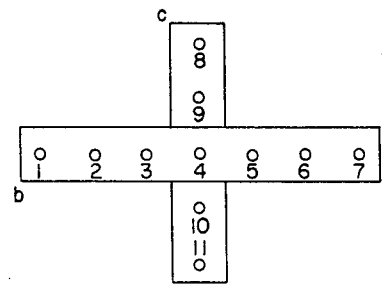
FIG. 5 is an elevational view of a holder for the object ends of the optic fibers.

Referring now to FIG. 5, there is shown an elevational view of the front face of the object holder 38 and showing the Fresnel image pattern of passageway ends at which the individual optic fibers terminate. The pattern includes the passageways 1, 2, 3, 5, 6 and 7 in which optic fibers emitting a green light will be located to provide a horizontal datum line of green lights. In vertical alignment are passageways 11, 4, 10, 9 and 8. A red light emitting fiber is located in passageway 11, and in passageways 8, 9, 10 and 4 yellow light emitting optic fibers are located.

Figure 6:
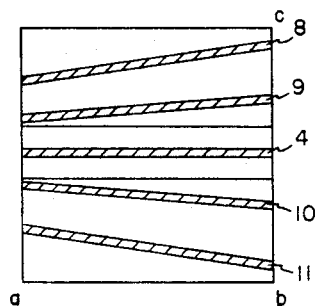
FIG. 6 is a sectional view taken on line 6—6 of FIG. 5.

As shown in the cross sectional view of FIG. 6 in conjunction with the elevational view of FIG. 5, the passageways numbered 1 to 7 are drilled parallel to the base line $a - b$ of holder 38. The base line $a - b$ is parallel to the correct flight path for a plane landing on the carrier 40. The passageways 9, 8 are drilled at increasing angles upward from the base line $a - b$. The passageways 10 and 11 are drilled at increasing angles downward from the base line $a - b$. Each of the angles for passageways 9 and 8 correspond to the angle above the flight path at which the light in that particular passageway will be seen by a pilot approaching the carrier. For example, if the plane is approaching the carrier at a very high angle, the pilot will see only the light at the position, passageway 8, because of its upward angle and none of the lights in passageways 9, 4, 10 and 11. The lights in passageways 10 and 11 simulate a too low approach and will be seen, because of their declining angle, when the pilot approach is below the desired angle of approach.

Figure 3:
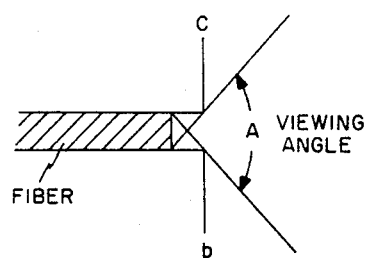
FIGS. 3 and 4 illustrate a method of recessing optic fibers to vary the viewing angle.
Figure 4:
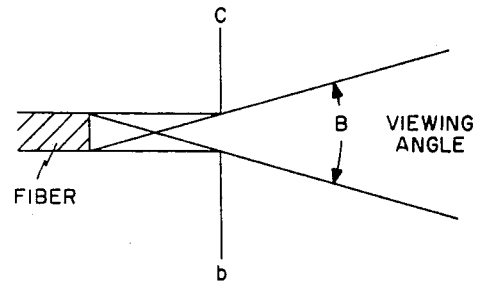

The lights to which reference is made above is the light passed on each individual optic fiber from the laser light source. Green fibers, i.e., the fiber of fiber pack 32 receiving green light from the laser, are positioned in the passages 1, 2, 3, 5, 6 and 7 and pushed through until they are nearly flush with face b - c of holder 38. This allows the green lights to be seen over a large angle, see angle A of FIG. 3, as required for the datum line on the FLOLS. Yellow fibers, those from fiber pack 30, are positioned in passageways 8, 9, 10 and 4 and pushed into the compartments only part way to the face $b - c$. This limits the angle over which these lights are visible to the pilot as shown by the smaller angle B in FIG. 4. The red fiber, from the single fiber pack 28, is pushed in part way in passageway 11 such that its angle of visibility is also limited to angle B of FIG. 4. As one views the above described pattern he will see the correct colored lights over the appropriate angles. The green light line is visible over approximately 40 degrees angle in the vertical and horizontal directions. The yellow and red lights are seen over about 2 degrees angle in the vertical and horizontal.

Figure 7:
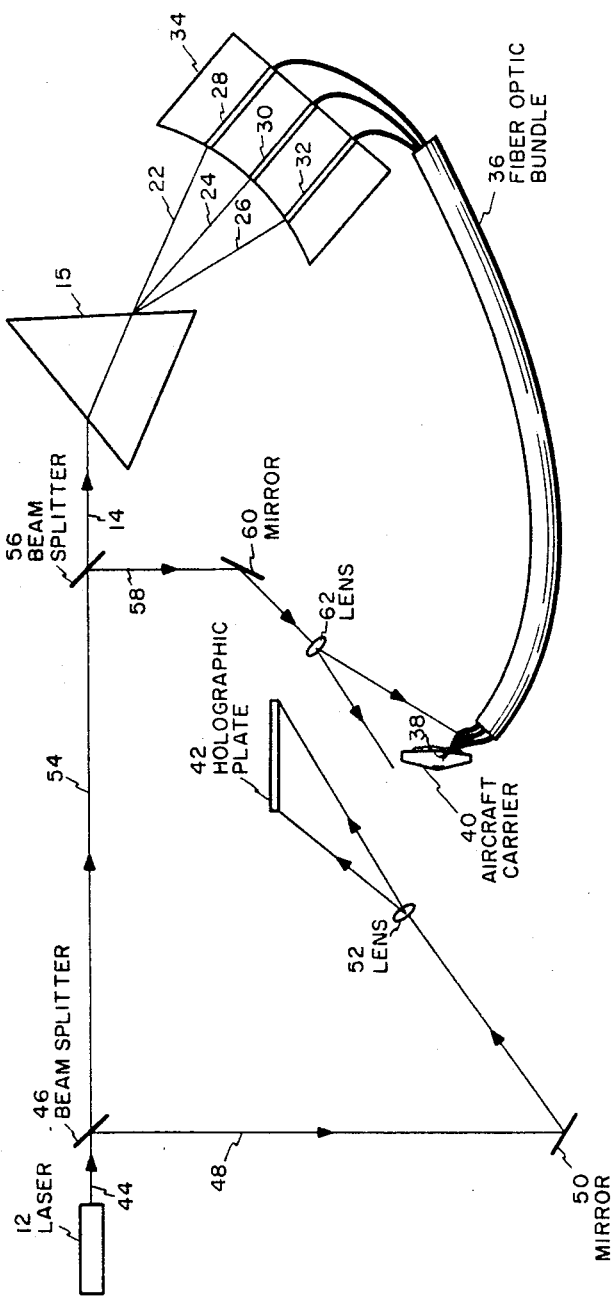
FIG. 7 is a diagrammatic view of the arrangement of apparatus for producing the holographic image.
Figure 8:
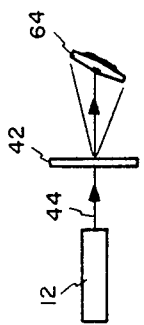
FIG. 8 is a diagrammatic illustration of the formation of the end product holographic image.

The holder 38 and its enclosed optic fiber ends is now placed on the deck of the aircraft carrier model 40. The model is then placed in a holographic set up. FIG. 7 illustrates diagrammatically one set up for forming the multicolor hologram. A laser beam 44 is passed into the set up and impinges on a beam splitter 46. A reflected beam 48 is then redirected off a mirror 50, through a lens 52, to the holographic plate 42, to act as the holographic reference beam. A beam 54 which passes through the beam splitter 46 impinges on a second beam splitter 56. A reflected beam 58 is then redirected off a mirror 60, through a lens 62, to the aircraft carrier model 40, to illuminate the model and act as a part of the holographic object beam. The derived laser beam 14 which passes through beam splitter 56 then impinges on the prism 15, to be separated into the appropriate colors as described in relation to FIG. 1. The three individually colored beams then pass through the fiber optic holder 38 on the deck of the aircraft carrier model 40. This set of fibers and the holder 38 now comprise a simulation of the FLOLS and act as a second component part of the holographic object beam. The optical paths length of all object paths are adjusted to be equal to the optical path of the reference beam to well within the coherence length of the laser. The relative beam ratio of the reference beam to the total object beam (aircraft carrier plus FLOLS) is then adjusted to be an appropriate value. A holographic exposure is then made and the resulting hologram 64 is ready for use in a simulator. The hologram is reconstructed conventionally from the holographic plate 42 by illuminating it with a laser beam identical to or conjugate with the original reference beam. The hologram is now ready for viewing. When a pilot trainee views the holographically generated image he will see the carrier and the FLOLS pattern. The green datum line will be apparent in proper respect to the carrier. The trainee will see the correct light on the carrier deck to indicate his angle of approach. The holder 38 which can be made of wood, plastic, metal or other materials, will be optically black to reduce reflections in the fiber passageways. The holder 38 size will be determined by the scale of the carrier 40 to which it is attached.

What is claimed is:

1. The method of generating a holographically reconstructed image of a model object so that said image will appear to have lamps of various predetermined color at predetermined locations and said method comprising the following steps:
   a. providing a model object,
   b. providing a laser light source having a laser beam output comprising a plurality of wavelengths characteristic of different colors,
   c. providing a light source divider means positioned to divide a portion of said beam into characteristically colored beams,
   d. providing a plurality of light transmitting fibers, each having one end positioned to receive light from a selected one of said colored beams and the other end located at said model in one of said predetermined locations so as to emit light of said selected color,
   e. applying said laser beam to generate a hologram of said model and said light emitting fiber ends, and
   f. illuminating said hologram with said laser beam to generate said holographically reconstructed image including the light pattern of said light emitting fiber ends.

2. The method according to claim 1, including
   a. the step of grouping said light transmitting fibers in fiber optic bundles to provide for multiple lights of the same color at the object end in selected locations as desired.

3. The method according to claim 1, including
   a. the step of recessing said optic fiber ends in said model object a distance determining desired predetermined sectors of viewability.

4. The method according to claim 2, including
   a. forming said model object of the model of an aircraft carrier and a holder mounted thereon for receiving the object ends of said fibers,
   b. forming a first plurality of horizontal spaced passageways central and above said base line in said holder, each succeeding passageway above the base line being inclined upwardly at successively increasing angle to receive fibers carrying yellow color light, and
   d. forming a downwardly inclined passageway in said holder to receive a fiber carrying red light, whereby said green, yellow and red light carrying fibers present a Fresnel Lens Optical Landing System pattern and provide predetermined sectors of viewability to a trainee pilot in a holographic carrier landing trainer.

5. The method according to claim 4, including
a. varying the position of said optic fibers longitudinally in said passageways to vary the degree of viewing angle to a desired viewing angle suitable to the approach landing pattern desired in the ultimate hologram.

* * * * *

UNITED STATES PATENT OFFICE
CERTIFICATE OF CORRECTION

Patent No. 3,761,156      Dated September 25, 1973

Inventor(s) Windell N. Mohon, et al.

It is certified that error appears in the above-identified patent and that said Letters Patent are hereby corrected as shown below:

In the heading [75] Inventors "Alfred H. Bodemann" should read -- Alfred H. Rodemann --.

Signed and sealed this 26th day of February 1974.

(SEAL)
Attest:

EDWARD M. FLETCHER, JR.      C. MARSHALL DANN
Attesting Officer      Commissioner of Patents